United States Patent [19]
Venturoli et al.

[11] Patent Number: 5,782,210
[45] Date of Patent: Jul. 21, 1998

[54] ELECTRONIC IGNITION SYSTEM FOR REVERSIBLE INTERNAL-COMBUSTION ENGINES

[75] Inventors: Alessandro Venturoli; Gianni Regazzi, both of Bologna, Italy

[73] Assignee: Ducati Energia S.p.A., Bologna, Italy

[21] Appl. No.: 665,687

[22] Filed: Jun. 18, 1996

[30] Foreign Application Priority Data

Jun. 21, 1995 [IT] Italy .................. MI95A1333

[51] Int. Cl.$^6$ .................. F01L 13/02; F02P 7/067
[52] U.S. Cl. .................. 123/41 E; 123/414; 123/417
[58] Field of Search .................. 123/41 R, 41 E, 123/149 C, 414, 417, 602

[56] References Cited

U.S. PATENT DOCUMENTS

| | | | |
|---|---|---|---|
| 2,881,744 | 4/1959 | Fox | 123/41 R |
| 3,189,009 | 6/1965 | Andersen | 123/41 E |
| 5,036,802 | 8/1991 | D'Amours | 123/41 E |
| 5,161,489 | 11/1992 | Morooka | 123/41 E |

FOREIGN PATENT DOCUMENTS 234069  9/1923  Canada.

*Primary Examiner*—Tony M. Argenbright
*Attorney, Agent, or Firm*—Young & Thompson

[57] ABSTRACT

An electronic ignition system for reversible internal combustion engines. The ignition system comprises a voltage generator (10, 11) for feeding the ignition circuit (12, 13) of the engine (P), a first signal pickup device (PK1) in the voltage generator (10, 11) for providing a first timing signal and a second signal pickup device (PK2) angularly spaced part in advance for providing a second timing signal to a microprocessor (18) operable to detect the direction and the speed of rotation of the engine, and to generate control signals for sparking during forward or reverse running, depending on timing information provided to the microprocessor (18) by the first and second signal pickup devices (PK1, PK2). Reversal of rotation is started by providing the microprocessor (18) with a reverse control signal by a manually actuable switch device.

11 Claims, 4 Drawing Sheets

ELECTRONIC IGNITION SYSTEM FOR REVERSIBLE INTERNAL-COMBUSTION ENGINES

BACKGROUND OF THE INVENTION

The present invention relates to an electronic ignition system for reversible internal-combustion engines, particularly for two-stroke engines having one or more cylinders, by means of which it is possible to control the sparking of the ignition both during normal forward or reverse rotation of the engine, and during reversal of rotation, by means of a microprocessor programmed to control all the engine ignition and operating procedures, depending on timing signals provided by pickup devices of voltage generator powering the same ignition system of an engine.

As is known, a two-stroke engine has a structure which does not vary substantially with respect to the rotational direction of the same engine, so that the sole parameter which determines the preferential direction of rotation of the engine is the ignition timing signal which must be suitably advanced with respect to the top dead centre of the corresponding cylinder of the engine. This substantial operational symmetry of a two-stroke engine may sometimes be problematic, to the point that ignition system designers are obliged to adopt special contrivances to inhibit the ignition during reverse rotation, in which case the ignition system would not produce any spark or would produce a spark which is not in timed relation with the running, such as to prevent the combustion and regular operation of the engine from taking place.

In some applications, however, it may be necessary to have the possibility of reversing the rotational direction of the engine, for example in order to reverse the travel of a vehicle, maintaining stable engine operating conditions and safe reversing conditions.

At present mechanical solutions are known, whereby special gearboxes are provided for reversal of the drive, while maintaining normal rotation of the engine. The mechanical drive reversing systems which are currently available, however, are somewhat costly, bulky and hence difficult to adopt in the case of small- or medium-size engines, in particular for motor vehicles or similar applications.

Canadian Patent 234069 relates to a reversing mechanism comprising a complex arrangement of gear system which cannot be reversed without bringing it to a full stop. U.S. Pat. No. 2,881,744 and U.S. Pat. No. 3,189,009 disclose reversal mechanisms for internal combustion engines which again rely upon the mechanical arrangement or disposition of components which does not provide means for controlling the direction and rotational speed of the engine.

U.S. Pat. No. 3,189,009 and U.S. Pat. No. 2,881,744 have also proposed solutions which envisage the use of special electrical switching devices for reversing the rotation of the engine, but which do not allow complete and correct control of the ignition and reversal of the engine rotation, proving again to be costly, bulky and unreliable.

Since modern electronic ignitions are managed by a microprocessor, it would therefore be desirable to manage the ignition procedures and cause the reversal of rotation of the engine by means of suitable control signals picked from the voltage generated by the same magneto generator which is powering the ignition circuit of the engine. However, such a system up-to-now has been rejected since it would not be able to recognize the rotational direction of the engine both when running and during a reversal transient, hence proving to be unreliable and unsafe.

SUMMARY OF THE INVENTION

An object of the present invention is to provide an improved electronic ignition system, to allow reversal of the rotational direction of an internal-combustion engine of two-stroke type, which can allow a finer control of the operation being fully and reliably managed in its entirety by a microprocessor, and in which all the main operating parameters can be stored in a programmable non-volatile memory means for monitoring and recognizing at any time and controlling the operating mode of the engine, and consequently to manage all the ignition procedures.

In particular, an object of the present invention is to provide a microprocessor controlled ignition system, to allow reversal of the rotational direction of an engine, which is not only extremely reliable and safe in use, i.e. is able to recognize the direction of rotation and the operating conditions of the engine both when running and during a reversal transient, but which can also be easily adapted to a two-stroke engine, being of small dimensions and low-cost.

A further object of the present invention is to provide a microprocessor controlled electronic ignition system which is capable of reversing the rotation of the engine, as mentioned above, and which is also able to manage suitable operating routines, providing the possibility of automatically repeating one or more attempts to reverse the engine, should a preceding one have failed. Yet another object of the invention is to provide a microprocessor controlled electronic ignition system, as stated above, which is able to implement all the engine ignition procedures without the aid of a battery or external D.C. power source and is thus able to operate also with A.C. voltage systems, or in any case in which the battery or its recharging system should not be working at full efficiency.

The possibility of monitoring and recognizing the rotational direction of the engine and the successful outcome of reversal of rotation, avoiding accidental start-up in the opposite direction, allows this system to operate in conditions of maximum safety, providing a suitable acoustic and/or visual signal indicative of the real working condition of the engine and travel of the vehicle.

The above can be achieved by means of a microprocessor controlled electronic ignition system, for two-stroke internal-combustion engines, in which the use of at least a first and a second timing signal pickup means angularly spaced apart from one another are provided in a voltage generator which energizes the ignition circuit for sparking the engine so as to supply, with a predetermined advance, timing signals during the forward or normal and reverse rotation of the engine, by means of which it is possible to provide the microprocessor with suitable information indicative of the direction of normal or reverse rotation of the engine, its rotational speed, as well as the successful outcome or possible failure of an attempt to reverse the rotation, all while simplifying monitoring of the signals supplied by said timing signal pickup means.

BRIEF DESCRIPTION OF THE DRAWINGS

In principle, the invention is applicable to any engine with one or more cylinders using a two-stroke cycle; the invention will be now illustrated in greater detail hereinbelow with reference to an ignition system for a twin-cylinder engine, having opposite cylinders at 180°; in particular.

DESCRIPTION OF THE INVENTION

Figure 1:
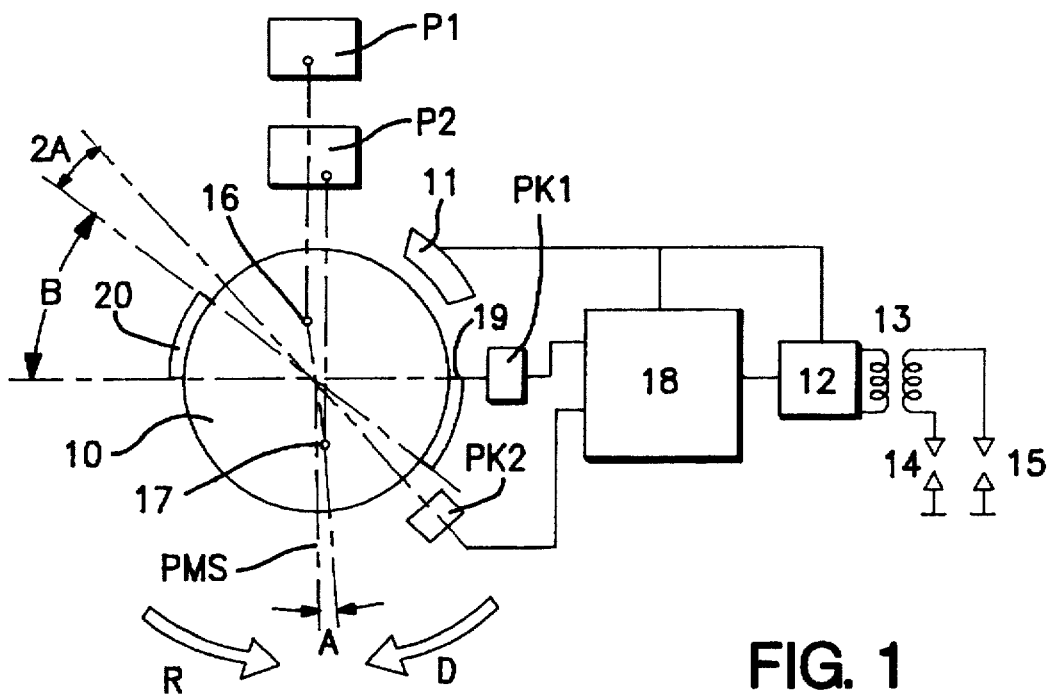
FIG. 1 is a schematic diagram of a twin-cylinder reversible engine and electronic ignition system according to the invention.

In FIG. 1 references P1 and P2 indicate the two pistons of a two-stroke engine, which are mechanically linked in a manner known per se, in opposite positions to the crank shaft of the engine connected to the rotor 10 of a voltage generator having a main winding 11 which powers an ignition circuit 12 connected to the high-voltage coil 13 for the spark plugs 14 and 15 of the engine. For the purposes of the present invention and purely by way of example, the pistons 10 and 11 of the cylinders have been ideally linked to two diametrically opposite points 16 and 17 of the rotor 10 of the voltage generator.

In FIG. 1, PK1 denotes a first signal pickup device which, during forward rotation D of the engine, supplies with a predetermined advance, with respect to a top dead centre position (TDC) of the piston, timing signals to a control unit 18, more simply referred to as "microprocessor", which governs the operating procedures for the ignition circuit 12; on the other hand, PK2 denotes a second signal pickup device which, during reverse rotation R of the engine, in turn supplies the microprocessor 18 with corresponding reverse-phase signals, as explained further below.

In FIG. 1, piston P1 is shown close to the top dead centre and the other P2 in the vicinity of the bottom dead centre, with an advance A with respect to the top dead centre indicated by the line PMS; from the same example shown in FIG. 1 it can be noted, moreover, that in the case of a twin-cylinder engine, the rotor 10 of the voltage generator is provided with two teeth 19, 20 for activating the pickups PK1 and PK2, which teeth circumferentially extend over an arc B of predetermined length, designed to supply a timing signal for a duration sufficient to allow the microprocessor 18 to recognize, on the basis of programmed data, the same timing signal from noise signals and calculate the exact instant of time for generation of the spark in the plugs 16 and 17.

From the same FIG. 1, finally, it can be noted that the second pickup PK2 which emits the timing signal during reverse rotation of the engine, is angularly spaced forward in the direction of normal rotation D, with respect to the pickup PK1, by an angle equal to the sum of the angle B of extent of the teeth 19, 20, with an angle 2A, double or in any case greater than the angle of advance A of the pickup PK1 emitting the timing signal during forward rotation.

In the specific case of a twin-cylinder two-stroke engine, in view of its structural and functional symmetry, use has been made of two teeth 19, 20 in diametrically opposite angular positions, which extend over an arc of circle which, added to double the angle of advance A of PK1, defines the axis for the second pickup PK2; however, it is obvious that the number of teeth, their disposition and angular extent the number, type and position of the various timing signal pickups may also vary with respect to that shown, the innovative features of the present invention remaining the same.

Figure 2:
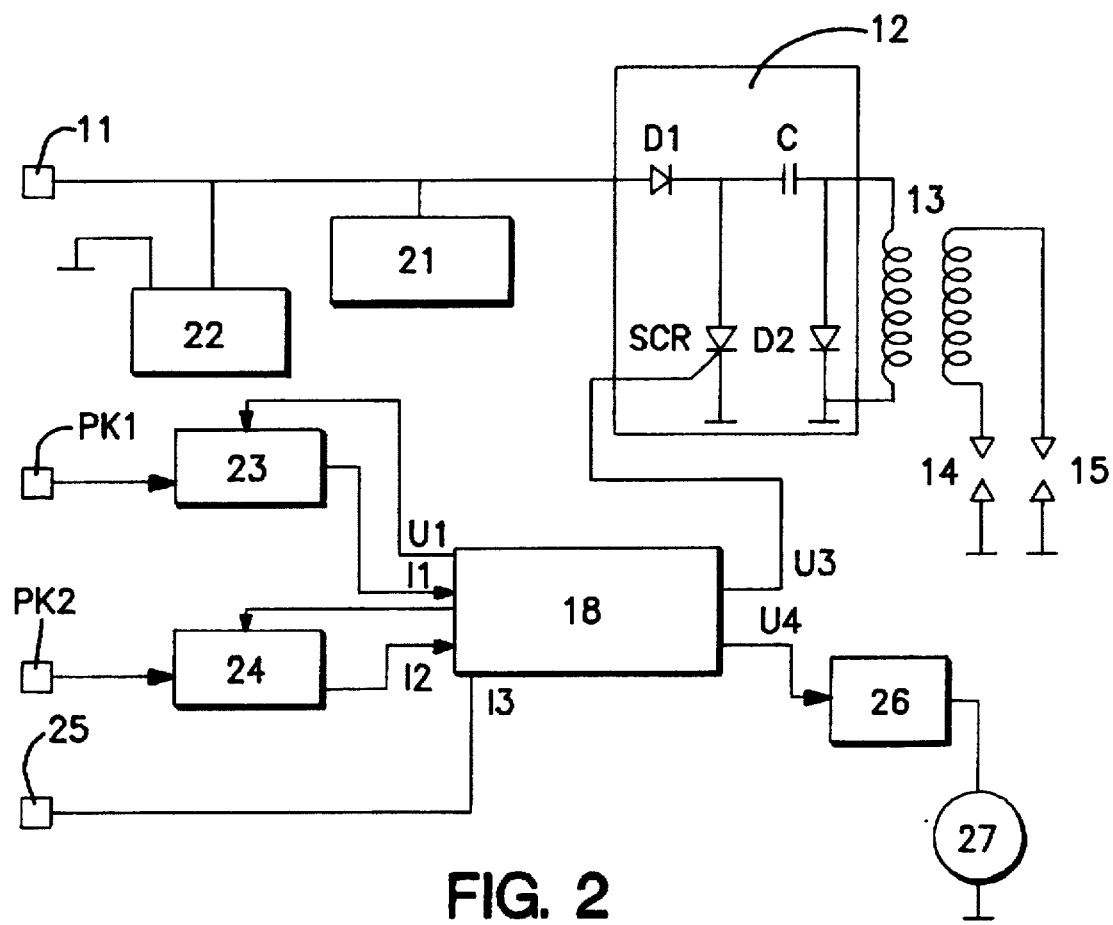
FIG. 2 is a detailed block diagram of the electronic ignition system of FIG. 1.

FIG. 2 of the drawings shows the detailed block diagram of the electronic control unit and an ignition circuit 12 of capacitive type.

In said figure it can be noted that the voltage output from the winding 11 of the voltage generator, if necessary increased by a booster circuit 21, is fed via the diode D1 to the capacitor C of the ignition circuit connected to the primary winding of the ignition coil 13, under the control of an electronic switch SCR which may be activated and deactivated by the output U3 of the microprocessor 18 suitably programmed to manage operation of the ignition circuit 14 both during conditions of normal rotation D and during conditions of reverse rotation R, as well as during reversal of the rotation.

In turn, the voltage of the generator 11 is supplied to an electronic unit 22 for controlling the energization to the logic of the microprocessor 18.

Figure 3:
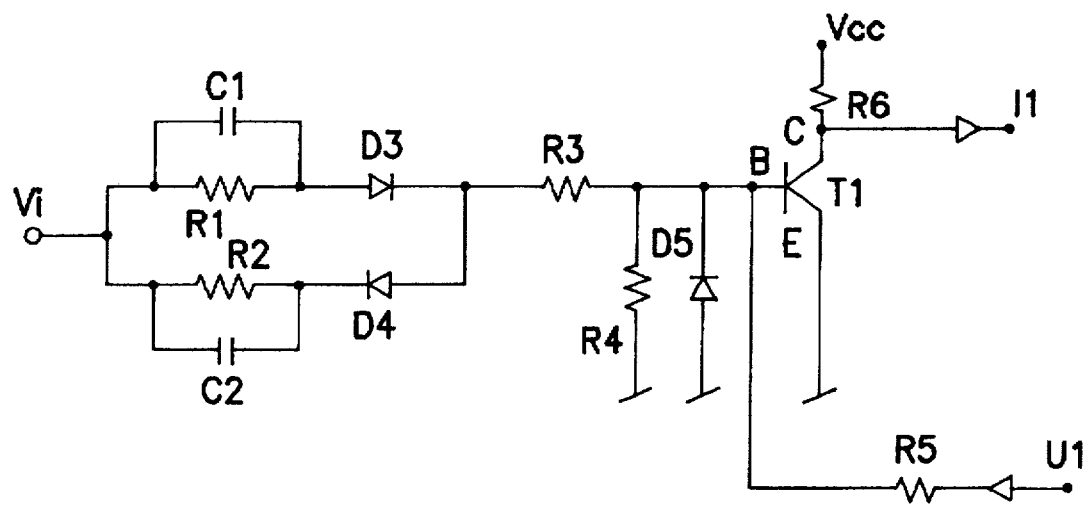
FIG. 3 is an electrical diagram of one of the input stages connecting each timing signal pickup to an input of the microprocessor.

From FIG. 2, it can be noted, finally, that the timing signal emitted by the forward rotation pickup PK1 is supplied to an input I1 of the microprocessor 18 via a first input stage 23, shown in FIG. 3; correspondingly, the timing signal supplied by the reverse-rotation pickup PK2 is supplied to a second input I2 of the microprocessor via a second input stage 24 identical to the preceding one. Reference 25 in FIG. 1 denotes, moreover, a switch device which can be manually actuated and is designed to emit a reversal command signal which is supplied to an additional input I3 of the microprocessor 18, to start reversal of rotation of the engine.

The outputs U1 and U2 of the microprocessor 18 are fedback to the two input stages 23 and 24 as shown in FIG. 3, while its outputs U3 and U4 are sent to the control electrode of the SCR and to a circuit 26 for powering an acoustic and/or light source device 27, such as a buzzer or the like.

With reference now to FIG. 3, we shall briefly describe the detailed electric diagram of the input stage 23 for the device PK1 picking up the timing signal for forward rotation.

The circuit in FIG. 3 comprises a first peak detector for the positive input signals Vi supplied by PK1, which consists of the capacitor C1 in parallel with the resistor R1 and of the diode D3 connected to the base B of a transistor T1 via a voltage divider R3, R4.

The circuit shown in FIG. 3 comprises moreover a second peak detector for the negative input signals, consisting of the capacitor C2 in parallel with the resistor R2 and an inverted diode D4, again connected to the base B of T1 via the voltage divider R3, R4; a branched off-diode D5 is provided for the protection of T1.

The use of the two parallely arranged positive and negative peak detectors in each input stage 28 and 29 prevents the background noise of the timing signal pickups from creating false signals for the microprocessor 18.

The collector-emitter circuit CE of T1 is directly connected to ground, as well as to a continuous voltage source VCC via resistor R6, and to the input I1 of the microprocessor 18 to which, depending on whether T1 is in the inhibited or conducting state, a high or low signal is supplied, said signal being able to be maintained for a predetermined period of time, keeping the base B of T1 polarized via a signal at the output U1 of the microprocessor 18, connected to the base of T1 via a resistor R5.

Operation of the circuit shown in FIG. 3 is as follows: when, during the positive half-wave of the voltage Vi generated by PK1, downstream of D3 or D4, a positive signal is supplied to the base of T1, the latter switches ON into its conductive state and a low signal is present at the input I1 of the microprocessor. If this low signal, after the transition, remains for a sufficient length of time, the microprocessor 18 recognizes the state and causes the output U1 to go high. Thus T1 is kept in its conductive state until, downstream of D3, D4, the signal of the negative wave generated by PK1 occurs, which signal will therefore negatively polarize the base of T1, bringing it back into its inhibited or OFF state.

The input of I1 of the microprocessor therefore undergoes a low-high voltage level transition; if the high level signal remains for a sufficiently long time so as to exclude the possibility of noise on the line of PK1, then the output U1 of the microprocessor goes low, remaining in this state until T1 is made to conduct again by a successive positive signal supplied by the timing pickup PK1.

In this way a Schmitt trigger is formed on the microprocessor input signal, which, in addition to benefiting from filtering of the peak detectors, takes also advantage of the microprocessor processing capacity, managing to distinguish the useful signals from those caused by noise, on the basis of the duration of the signals themselves.

With reference now to the remaining figures, we shall describe the various operating modes of the electronic ignition system according to the invention.

Normal Operation

Upon start-up of the engine, the microprocessor 18 passes from an initial state S0 (FIG. 7) to a state S1 in which ignition for operation in normal or forward rotation is managed, as indicated by the arrow D in FIG. 1: in these conditions, each time one of the teeth 19 and 20 of the rotor 10 (FIG. 1) moves facing the pickup PK1, the latter generates first a positive voltage pulse Vi which, via the peak detector for positive input signals C1, R1 and D3 and the voltage divider R3 and R4, is applied to the base B of the transistor T1. The latter, as previously described, switches from high to low the input I1 of the microprocessor 18, in conditions of normal rotation, will trigger the spark SC (FIG. 4) at each time interval in which the signal associated with the timing pickup PK1 remains high. In this way, the ignition advance which can be performed by the microprocessor 18 is variable from a minimum value indicated by A, to a maximum value equivalent to A+B. Therefore, if a given fraction of the time T between the front and tail ends of two successive signals of PK1, for example T/4 is greater than the reference time Tcont between the front end of a signal of PK1 and the tail end of corresponding signal of PK2 (FIGS. 7 and 8), the microprocessor will emit on its output U3 a control signal which will result in ON-condition for the SCR of the ignition circuit, causing a spark in the spark plug of a corresponding cylinder of the engine, after which the cycle will be brought back to the initial state. If, on the other hand, as shown in the diagram in FIG. 7, the microprocessor 18 detects a stoppage of the engine or a signal anomaly, from the state S1 it returns into the initial state S0 for start-up of the engine.

Reverse rotation

Figure 5:
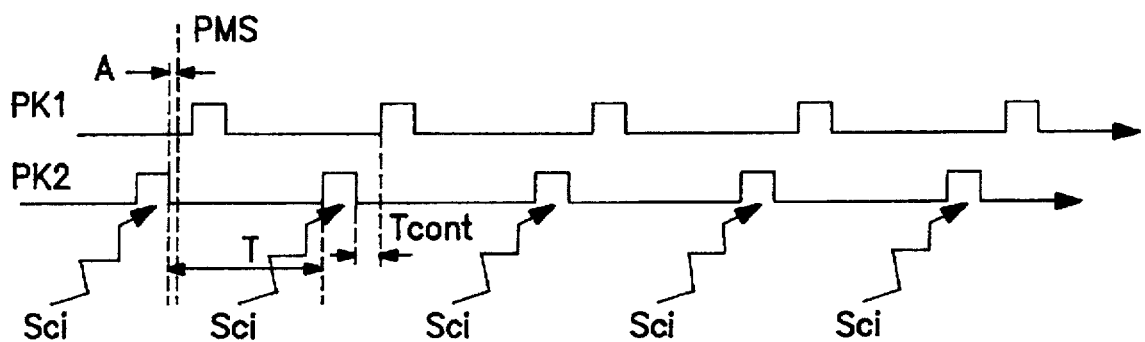
FIG. 5 is a graph showing the timing signals provided to the microprocessor by the two pickups during reverse rotation of the engine.

The above comments are also applicable to reverse rotation of the engine; in this second condition, as shown in the graph of FIG. 5, the spark SCi is triggered in the time interval in which the signal associated with the pickup PK2 remains high. As regards the timing, the same considerations made for normal or forward rotation are therefore applicable. The microprocessor controlled ignition system, according to the present invention, in any case allows the ignition phase for reverse rotation to be distinguished from the normal rotation, by including an addend dedicated to this function among the memorized parameters for configuration of the microprocessor status.

Reversal of rotation

Figure 7:
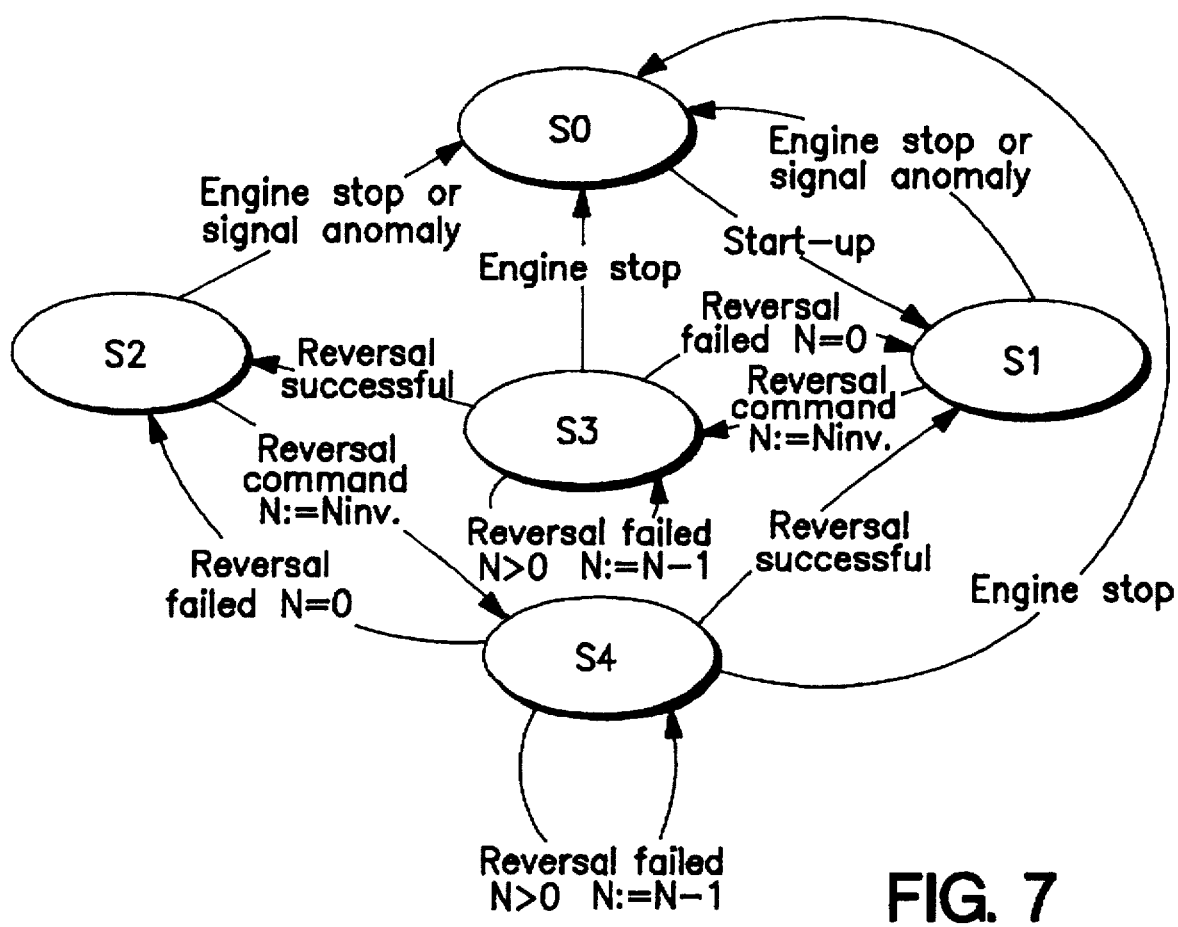
FIG. 7 is a diagram indicative of the operative states of the microprocessor which manages operation of the entire ignition system.
Figure 6:
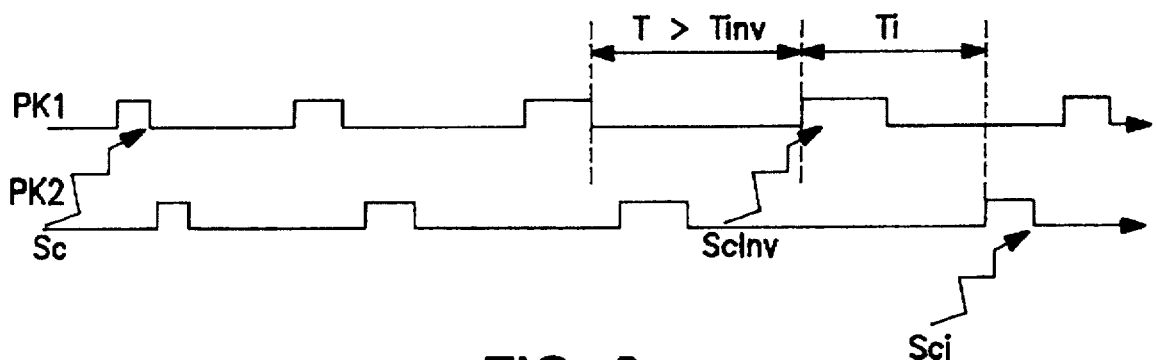
FIG. 6 is a graph of the timing signals provided to the microprocessor by the two pickups which are indicative of the successful outcome of reversal of the engine rotation.
Figure 8:
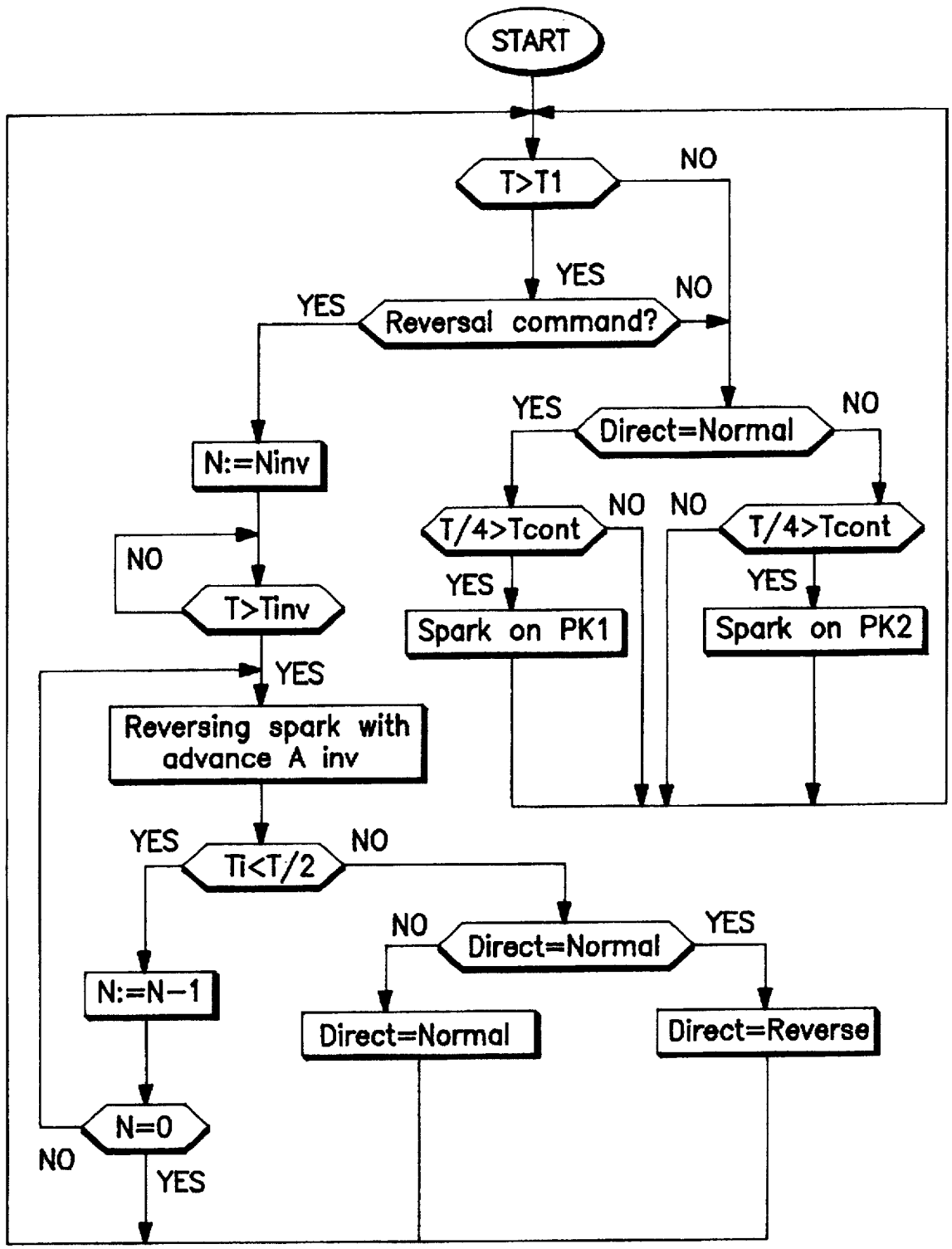
FIG. 8 is a flowchart of the logic for management of the direction of rotation.

Reversal of the engine rotation, from the direct forward to the reverse direction, or vice versa, will now be described with reference to FIGS. 6, 7 and 8 of the accompanying drawings.

Figure 4:
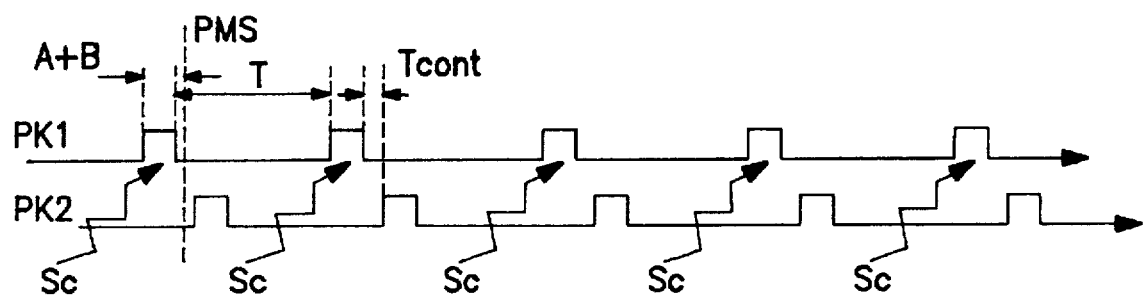
FIG. 4 is a graph showing the timing signals provided to the microprocessor by the two pickups during normal or forward rotation of the engine.

The principle on which reversal of the rotation is based is as follows: the system, during normal operating conditions (FIG. 4), causes the spark SC to be produced with a suitable advance which is determined by the microprocessor and of a magnitude for optimizing the useful work associated with combustion. When the reversal command is issued via a switch or other manually operated electrical device 25 (FIG. 2), the system, provided that the time interval T indicated in FIGS. 4 to 6 is greater than a parameter T1 stored in the memory of the microprocessor 18 which identifies the maximum speed of engine at which reversal of rotation can occur (FIG. 8), assumes the state S3 shown in FIG. 7 and stops the sparking (FIG. 6) until the speed of rotation of the engine falls below a level defined by a prestored parameter Tinv calculated as the time T occurring between the negative edge and the positive edge of two adjacent signals associated with one of the two pickups, for example the pickup PK1 according to the graph in FIG. 6; when the system, being in the state S3 according to FIG. 7, recognizes that the speed of rotation has reached the value defined by Tinv, i.e. T greater than Tinv, it produces a a reversal spark "ScInv" (FIG. 6) with an advance Ainv much greater than normal. The work associated with combustion will thus be negative and if the reversal procedure is correct, the microprocessor will assume the state S2 (FIG. 7) in which ignition for operation in the reverse direction is managed, the direction of rotation of the engine thus being reversed (the high value of the advance will ensure that combustion is produced during the compression phase, thus working in the opposite direction to rotation).

Once reversal has been performed, the system will generate the spark "Sci" (FIG. 5) with the correct advance with respect to the top dead centre TDC in the reverse rotation condition.

In this case also, if the engine stops or a signal anomaly is detected, the system returns from the state S2 into the initial state S0.

In the case where the first attempt at reversal should fail, the procedure of the state S3 is repeated an N number of times, for example decrementally counted by the microprocessor, and when N is eventually equal to zero the system returns into the state S1 in which ignition for normal rotation is managed.

Once reversal has been correctly performed, the microprocessor 18, being in the state S2, with its output U4 will activate the circuit energizing the reversal signalling device or buzzer 27, thus providing a sound or light signal indicating that the engine is running in the reverse direction.

If one wishes to reverse again in the forward direction the rotation of the engine, the microprocessor will be switched from the state S2 to the state S4 in which the transition from reverse rotation to normal rotation is managed, using a procedure substantially similar to that described above.

From the above description and illustrations with reference to the accompanying drawings, it will therefore be understood that it has been possible to provide a microprocessor controlled electronic ignition system for two-stroke, reversible, combustion engines, by means of which numerous advantages can be achieved, i.e.:

a) the system is completely parameter-based since all the main operating parameters are memorized in a non-volatile and programmable memory means of the microprocessor;

b) the system is able to recognize the direction of rotation of the engine both during operation and during a reversal transient;

c) the system can be adapted to the engine in an extremely simple manner since it has the same dimensions as a conventional ignition system, involving installation of only one additional timing signal pickup device;

d) owing to the feature referred to in the preceding para. b), the system is able to manage particular operating routines depending on the outcome of the reversal attempt, thus making it possible to repeat this attempt several times, should the previous attempt fail;

e) the microprocessor logic which controls the ignition advance and which performs the reversal procedures functions without the aid of a battery and is thus able to operate also in ignition systems with A.C. voltage regulation, or in any case is able to function even in the case of inefficiency of the battery or its recharging system;

f) reverse operation is signalled acoustically and visually;

g) the system is also able to avoid accidental start-up in the reverse direction, thus resulting in extremely reliable and safe operation.

What is claimed is:

1. An electronic ignition system suitable for a reversible combustion engine, in which the engine comprises at least one piston reciprocable inside a respective cylinder, between a top dead centre and a bottom dead centre, and in which the piston is linked to the rotor of a voltage generator for powering an ignition circuit of the engine, and in which an electronic control unit is provided for controlling said ignition circuit, comprising:

a first timing means (PK1) cyclically actuated by the rotor of the voltage generator to provide a control signal indicative of the forward rotation of the engine, and a second timing means (PK2) cyclically actuated by said rotor, said second timing means (PK2) being angularly spaced apart from the first timing means (PK1), in the forward direction of rotation of the engine, to provide a phase-delayed control signal during forward rotation, and to supply a phase-advanced control signal during reverse rotation of the engine, with respect to the first timing means (PK1), and wherein said electronic control unit comprises a microprocessor provided with program means to control the ignition procedures of the ignition circuit of the engine both during forward rotation and reverse rotation, and means to allow reversal of the engine rotation below a predetermined number of revolutions of the engine, in relation to timing signals provided by said first and second timing means.

2. An electronic ignition system according to claim 1, in which said first timing means (PK1) provides timing signals having a first angle of advance (A) with respect to the top dead centre of the position, wherein the rotor of the voltage generator comprises tooth means for activating said timing means, peripherally extending over an angle (B) greater than the angle of advance (A) of the first timing means (PK1), and the second timing means (PK2) is angularly spaced apart from the first timing means (PK1) to provide timing signals having an angle of advance greater than the sum of the angle of advance (A) of the first timing means (PK1) and the angle (B) of extent of said tooth means.

3. An electronic ignition system according to claim 2, suitable for an engine having two opposing cylinders, wherein said tooth means comprise a first and a second tooth members projecting from opposite sides of the rotor of said voltage generator, each of said tooth members circumferentially extending over a timing angle (B) and the second timing means (PK2) is angularly spaced apart from the first timing means (PK1) by an angle equal to the sum of said timing angle corresponding to the extent of the tooth members and an angle equal to twice the advance angle of the first timing means (PK1).

4. An electronic ignition system according to claim 1, wherein said electronic control unit comprises memory means programmed to provide an output signal for triggering the discharge of the ignition circuit with an advance comprised between the advance (A) of the first timing (PK1) means and the advance (A, B) of the second timing means (PK1, PK2).

5. An electronic ignition system according to claim 1, wherein each of the said timing means (PK1, PK2) is connected to a respective data input of the electronic control unit via a peak detector.

6. An electronic ignition system according to claim 5, wherein said peak detector is connected to a binary input of the electronic control unit via a dual state, electronic switch device, said electronic switch device being switchable between first and second states depending on control signals generated by the respective timing means and maintained in said second state for a predetermined period of time by a control signal emitted at an output of the microprocessor of the same electronic ignition system.

7. An electronic ignition system according to claim 1, wherein said electronic control unit comprises a microprocessor programmed to operate different working states of the ignition circuit during the forward rotation, the reverse rotation and the transition from one rotational direction to the opposite rotational direction engine, respectively.

8. An electronic ignition system according to claim 7, wherein said microprocessor, in the reverse rotation conditions of the engine, is programmed to emit a control signal for at least one of an acoustic and light signalling device.

9. An electronic ignition system according to claim 7, wherein said microprocessor, when in rotation transition state, is programmed to automatically repeat the rotation reversal procedure for a predetermined number of times.

10. An electronic ignition system according to claim 7, wherein said microprocessor is programmed to recognize the direction and the speed of rotation of the engine, depending on the time intervals occurring between pulse signals of said timing means.

11. An electronic ignition system according to claim 7, wherein said microprocessor is programmed to emit a control signal for the ignition circuit to trigger a reversal spark depending on a comparison of the time interval occurring between two adjacent pulse signals of the first and second timing means with a memorized reference time parameter indicative of the rotational speed at which reversal of the engine can take place.

* * * * *